(12) United States Patent
Fogg

(10) Patent No.: US 10,915,895 B1
(45) Date of Patent: Feb. 9, 2021

(54) MANAGING ELECTRONIC CRYPTOCURRENCIES

(71) Applicant: Perkins Coie LLP, Seattle, WA (US)

(72) Inventor: George K. Fogg, Portland, OR (US)

(73) Assignee: Perkins Coie LLP, Seattle, WA (US)

( * ) Notice: Subject to any disclaimer, the term of this patent is extended or adjusted under 35 U.S.C. 154(b) by 695 days.

(21) Appl. No.: 15/603,820

(22) Filed: May 24, 2017

Related U.S. Application Data

(63) Continuation of application No. 15/450,665, filed on Mar. 6, 2017, now abandoned.
(Continued)

(51) Int. Cl.
*G06Q 40/00* (2012.01)
*G06Q 20/38* (2012.01)
*G06Q 20/06* (2012.01)

(52) U.S. Cl.
CPC ..... *G06Q 20/38215* (2013.01); *G06Q 20/065* (2013.01)

(58) Field of Classification Search
CPC ... H04L 2209/56; H04L 67/12; H04L 9/0825; H04L 9/0861; H04L 9/008; H04L 9/3242; H04L 2209/80; H04L 63/0442; H04L 63/08; H04L 63/1441; H04L 67/10; H04L 67/104; H04L 9/14; H04L 9/3066; H04L 12/04; H04L 12/06; H04L 12/08; H04L 2209/12; H04L 2209/42; H04L 2463/082; H04L 2463/121; H04L 27/38; H04L 41/0613; H04L 41/065; H04L 41/069; H04L 41/0853; H04L 41/0869; H04L 41/12; H04L 43/0882; H04L 43/12; H04L 47/19; H04L 51/02; H04L 63/00; H04L 63/0414; H04L 63/0421; H04L 63/0428; H04L 63/0435; H04L 63/045; H04L 63/0471; H04L 63/0823; H04L 63/083; H04L 63/0838; H04L 63/0853;
(Continued)

(56) References Cited

U.S. PATENT DOCUMENTS 9,965,804 B1 * 5/2018 Winklevoss ........... G06Q 40/04
10,269,009 B1 * 4/2019 Winklevoss ........... G06Q 20/36
(Continued)

OTHER PUBLICATIONS

Bitcoin: A Peer-to-Peer Electronic Cash System, Satoshi Nakamoto; satoshin@gmx.com, http//bitcoin.org/bitcoin.pdf, Mar. 2009 (Year: 2009).*
(Continued)

*Primary Examiner* — Lalita M Hamilton
(74) *Attorney, Agent, or Firm* — Perkins Coie LLP

(57) ABSTRACT

A method and system are configured for performing a transfer of digital currency from an owner of the digital currency to a recipient of the digital currency. The transfer of digital currency includes transferring a sequence of digitally signed transactions from the owner to the recipient. The method and system are further configured for recording the performed transfer of digital currency to a block chain public ledger, generating a digital contract for the recipient that converts the transferred digital currency from an intangible asset type to a financial asset type, and storing the generated digital contract along with electronic credentials associated with accessing the digital currency in a holding account for the recipient.

17 Claims, 5 Drawing Sheets

Related U.S. Application Data

(60) Provisional application No. 62/303,861, filed on Mar. 4, 2016, provisional application No. 62/313,342, filed on Mar. 25, 2016.

(58) Field of Classification Search
CPC . H04L 63/0884; H04L 63/102; H04L 63/123; H04L 63/1425; H04L 63/18; H04L 63/308; H04L 67/025; H04L 67/1042; H04L 67/1065; H04L 67/125; H04L 67/141; H04L 67/146; H04L 67/148; H04L 67/18; H04L 67/20; H04L 67/30; H04L 67/306; H04L 67/38; H04L 69/40; H04L 9/0894; H04L 9/16; H04L 9/3213; H04L 9/3226; H04L 9/3239; H04L 9/3263; H04L 9/3268; H04L 9/3271; G06Q 40/00; G06Q 20/38215; G06Q 20/065

See application file for complete search history.

(56) References Cited

U.S. PATENT DOCUMENTS

| | | | |
|---|---|---|---|
| 2015/0220928 A1* | 8/2015 | Allen | G06Q 20/0655 |
| | | | 705/67 |
| 2017/0076306 A1* | 3/2017 | Snider | G06Q 30/0205 |
| 2017/0221288 A1* | 8/2017 | Johnson | G07C 9/257 |
| 2019/0325405 A1* | 10/2019 | Melika | G06Q 20/384 |

OTHER PUBLICATIONS

Advancing a Framework for Regulating Cryptocurrency Payments Intermediaries Hughes, Sarah Jane; Middlebrook, Stephen T. Yale Journal on Regulation; New Haven vol. 32, Iss. 2, (Summer 2015): 495-559. (Year: 2015).*

* cited by examiner

MANAGING ELECTRONIC CRYPTOCURRENCIES

CROSS REFERENCE TO RELATED APPLICATIONS

This application is a continuation of U.S. patent application Ser. No. 15/450,665, filed Mar. 6, 2017, entitled MANAGING ELECTRONIC CRYPTOCURRENCIES, which claims priority to U.S. Provisional Patent Application No. 62/303,861, filed on Mar. 4, 2016, entitled MANAGING ELECTRONIC CRYPTOCURRENCIES, and U.S. Provisional Patent Application No. 62/313,342, filed on Mar. 25, 2016, entitled MANAGING ELECTRONIC CRYPTOCURRENCIES. This application also relates to U.S. Provisional Patent Application No. 62/105,686, filed Jan. 20, 2015, entitled MANAGING ELECTRONIC CRYPTOCURRENCIES which are incorporated by reference in their entirety.

BACKGROUND

In the current cryptocurrency ecosystems such as, for example, Bitcoin, parties lack information regarding existing liens and encumbrances. This circumstance leaves acquirers of bitcoins with the risk that their bitcoins may be subject to security interests and liens that diminish or eliminate the economic value of the bitcoins to owners. Accordingly, systems and/or processes are needed to alleviate these risks.

Overall, the examples herein of some prior or related systems and their associated limitations are intended to be illustrative and not exclusive. Other limitations of existing or prior systems will become apparent to those of skill in the art upon reading the following.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Overview

Figure 1:
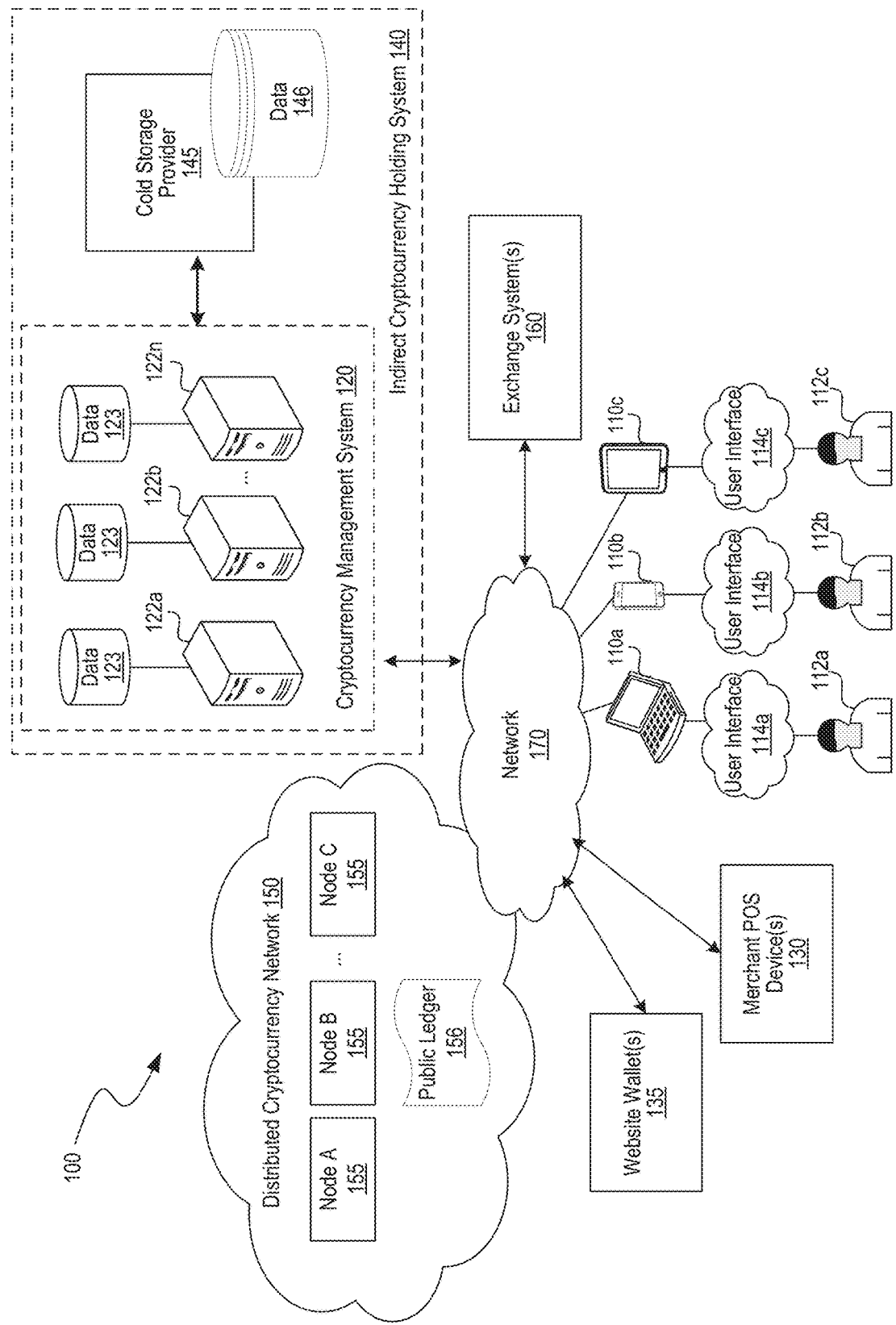
FIG. 1 is a diagram illustrating an example environment in which an indirect cryptocurrency holding system facilitates an encumbrance-free management of a cryptocurrency, according to an embodiment.

Systems and methods for managing digital cryptocurrencies, such as facilitating unencumbered transfers of digital currency between entities, are described. For example, the systems and methods may perform a transfer of digital currency from an owner of the digital currency to a recipient of the digital currency, where the transfer of digital currency includes transferring a sequence of digitally signed transactions from the owner to the recipient, record the performed transfer of digital currency to a block chain public ledger, generate a digital contract for the recipient that converts the transferred digital currency from an intangible asset type to a financial asset type, and stores the generated digital contract along with electronic credentials associated with accessing the digital currency in a holding account for the recipient.

In some embodiments, the systems and methods may generate a digital contract for a recipient of a cryptocurrency transfer that converts transferred cryptocurrency from an intangible asset type to a financial asset type, and store the generated digital contract along with electronic credentials associated with accessing the digital currency in a holding account for the recipient. The digital contract and electronic credentials, as well as other data described herein, may be stored in secure or tamper resistant memory, such as within a smart card, within secure non-volatile memory of a portable device (e.g., a mobile phone/tablet), or otherwise stored locally on a portable object, rather than being stored within a network or the cloud.

For example, the systems and methods may include an asset conversion module that converts cryptocurrency held by a user from an intangible asset type to a financial asset type, and an asset holding module that stores information identifying the cryptocurrency held by the user along with electronic credentials associated with accessing the cryptocurrency in a holding account for the user.

The following description and drawings are illustrative and are not to be construed as limiting. Numerous specific details are described to provide a thorough understanding of the disclosure. However, in certain instances, well-known or conventional details are not described in order to avoid obscuring the description. References to "one" or "an" embodiment in the present disclosure can be, but not necessarily are, references to the same embodiment, and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art within the context of the disclosure and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of the reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Examples of Managing Electronic Cryptocurrencies

Embodiments of the present disclosure describe systems and processes for managing electronic cryptocurrencies. Although the examples described herein are primarily directed to the Bitcoin cryptocurrency, it is appreciated that the technology can be equally applicable to any cryptocurrency.

Today's cryptocurrency ecosystem is only partially transparent. For example, a principal feature of Bitcoin is the transparency that results from having transactions listed on a public ledger (e.g., blockchains) that allows one to trace the ownership lineage of each Bitcoin transaction. This transparency—together with the irreversibility of each transfer of bitcoins—creates a very high level of assurance that the transferee of bitcoins is, in fact, receiving ownership of the bitcoins being transferred. These features (i.e., public record of ownership and irreversibility) are designed to mimic a transfer of cash where Party A takes the cash out of her wallet and hands it to Party B—the transfer is complete and Party B knows that she now has the cash.

Unfortunately, the transparency provided by today's cryptocurrency ecosystem is not comprehensive. The public ledger only identifies ownership. It provides no information on others having an interest in the owner's bitcoins, such as lienholders. Accordingly, today's cryptocurrency ecosystem is akin to buying a house when the buyer has perfect information on who owns the house, but no information on the existing mortgages on the house.

UCC Article 9 has been adopted, with minor variations, in all 50 states and the District of Columbia. It is the statute that provides for the creation of liens on personal property (known as "security interests") and the rights and duties of persons granting security interests (known as "debtors"), persons receiving security interests (known as "secured parties") and persons having an interest in the property subject to a security interest (known as "collateral"). The UCC divides collateral into types, each of which is defined in the UCC, and provides different rules with respect to the different types of collateral. When analyzing the rights and obligations of parties to collateral, it is essential to know the type of collateral under the UCC. UCC Article 9 only provides for consensual liens; that is, liens that are granted by agreement of the debtor and secured party. Once the debtor grants a security interest to the secured party, the secured party must take certain actions to "perfect" its security interest in order to have the full benefit of the rights provided by Article 9. Perfection actions differ depending on the type of collateral.

Bitcoin is not "money" as defined by the UCC (and "currency" is not a type under Article 9). For a medium of exchange to be "money," it must be authorized or adopted by a government or established by agreement of two or more countries as a unit of account. Bitcoins are not "instruments" under Article 9, because by definition instruments only exist in written form and involve the payment of money. Bitcoins are not "inventory" under Article 9, because inventory (a sub-type of goods) is limited to items that have a tangible, physical existence. Accounts in which bitcoins are held are not "deposit accounts," because only accounts maintained by a bank are included within that defined term.

Under the current cryptocurrency ecosystem, bitcoins are classified as "general intangibles"—the UCC's catchall type of collateral. If a business has a secured line of credit with a financial institution, it would be highly unusual for the collateral not to include general intangibles. Thus, one consequence (whether intended or not) of a common secured financing transaction is that any bitcoins acquired by the borrower would become subject to the lender's security interest. This unintended consequence can be eliminated by creating the circumstances that result in bitcoins becoming a different type of collateral—"investment property"—under Article 9.

As noted, the type of collateral determines the method of perfection. The most common method for a secured party to perfect its security interest is by filing a financing statement in the appropriate office (usually the Secretary of State's office) of the state in which the debtor is incorporated or formed or in which an individual debtor has his/her principal residence. This is the sole method of perfecting a security interest in general intangibles and is one of the methods for perfecting a security interest in investment property. To be effective, the financing statement must describe the collateral, which description can be as general and vague as "all assets," or as specific as the secured party decides to make it.

A security interest in investment property can also be perfected by control over the account in which the investment property is held. Control is most commonly accomplished by a three-party agreement (known as a "control agreement") among the debtor, secured party and the intermediary maintaining the account. The essential element of a control agreement is the intermediary's agreement to honor instructions from the secured party (without further confirmation from the debtor). No public record of control agreements is required or maintained.

A security interest in general intangibles like bitcoin continues, notwithstanding the sale, license or other disposition of the collateral, unless the secured party consents to the transfer free of its security interest, the obligations secured by the security interest have been satisfied or the security interest has otherwise terminated. The most common exception—a buyer in the ordinary course of business takes free of security interested granted by the seller—does not apply to a purchaser of bitcoins. That exception only applies to a buyer of goods (i.e., tangible personal property) and nonexclusive licenses of general intangibles. Thus, each time a bitcoin passes through the hands of an owner whose property is subject to a security interest in general intangibles that bitcoin becomes burdened with the secured party's security interest.

In some embodiments, each bitcoin could be characterized as unique so that a bitcoin in the hands of the transferee is a different item of personal property than the bitcoin that was in the hands of the transferor. Upon transfer, a bitcoin has a different private key for accessing it than the transferor's private key—a different collection of computer code than its predecessor. This could solve some issues with the current bitcoin environment. Unfortunately, it unlikely that a court would accept the proposition that an item of personal property, and the security interest in that property, was extinguished by the mere transfer of it.

If Bitcoin transactions were anonymous, e.g., not traceable in a manner disclosing the names of parties involved, there would be two important UCC implications. First, a transferee could be unconcerned about a pre-existing security interest on its bitcoins, because the secured party would be unable to trace the encumbered bitcoin to the transferee. This would significantly mitigate concerns about nondisclosure of existing security interests. Second, the inability of a secured party to trace its security interest could make bitcoins unattractive as collateral, which inhibits the ability of investors to leverage investments in bitcoins. This has the negative affect of stifling robust investment in bitcoins.

However, Bitcoin transactions are not entirely anonymous. Evidence of each transaction is disclosed in the permanent public ledger. Although this disclosure does not directly identify the names of the parties involved, it contains sufficient information to allow some tracing. As has been demonstrated, the ability to detect patterns is sufficient to identify the flow of bitcoins through various exchanges and electronic wallet services. Under the Department of the Treasury Financial Crimes Enforcement Network's rules, these exchanges and wallet services are required to maintain records such that one can connect a particular public key in a Bitcoin blockchain to a person or entity. Exchanges and wallet services can be compelled to provide this identifying information, so it is available, although cumbersome and difficult for private parties to obtain.

The ability to identify parties to certain types of Bitcoin transaction allows a secured party, in those circumstances, to trace the movement of its bitcoin collateral to the current owner and enforce its UCC lien rights against the owner. It also allows a prospective transferee to determine whether the bitcoin it is acquiring is subject to UCC security interests. Currently, the ability to de-anonymize Bitcoin transactions to the point of identifying parties is difficult, but it is prudent to assume that this difficulty will be mitigated by the development of increasingly sophisticated algorithms and other methods for detecting patterns in Bitcoin transactions.

Diminishing anonymity of Bitcoin transactions raises privacy concerns and efforts to thwart linkage of Bitcoin transactions to identified parties are ongoing. However, a certain degree of transparency (i.e., diminished privacy) is required to allow for a commercially viable cryptocurrency ecosystem. Without the ability to ascertain if bitcoins are subject to UCC security interests (and other liens), Bitcoin will not evolve beyond the novelty stage or only as a payments exchange vehicle for small person-to-person transactions. Substantial investment in bitcoins will only occur if (a) all encumbrances on title are known and (b) investments can be leveraged with debt financing (which will not occur if title is uncertain).

Thus, today's cryptocurrency ecosystem is flawed at least because of the combination of (a) bitcoins being general intangibles, (b) security interests in general intangibles not being automatically released upon transfer and (c) the ubiquity of security interests in general intangibles that creates the fatal flaw—bitcoins that are encumbered with security interests granted by one or more prior owners. This flaw is not avoided by the current degree of transactional anonymity, because full transactional anonymity of Bitcoin transactions does not exist, and, in any event, is neither the solution, nor desirable. The cryptocurrency management systems and processes described herein overcome these and other issues.

In some embodiments, the optimal solution for dealing with security interests in bitcoins might be to revise Article 9 definitions of collateral types to create a separate category for cryptocurrencies to take them out of the catchall general intangibles type. Such a change would take years and require the adoption of statutory amendments by the states. In other words, it is not a feasible solution for this decade. Rather, the cryptocurrency ecosystem should look to the indirect holding system of financial intermediaries sanctioned under UCC Article 8 as a solution. Under an indirect holding system, the financial asset is held by a third party in an account maintained by the third party, which account is credited to the person with rights to the asset in the account.

Part 5 of UCC Article 8 provides the legal framework for (a) securities accounts, (b) the rights held in those accounts, (c) the rights of parties owning those accounts and (d) the obligations of those maintaining such accounts. Notwithstanding the chosen nomenclature, the statute applies to a broader universe than "securities." It applies to "financial assets," a category of property that is broader than "securities" and which is one key to the flexibility of UCC Article 8.

In some embodiments, the flaws in today's cryptocurrency ecosystem can be eliminated by changing the Article 9 collateral type of bitcoins from general intangibles to investment property, which is accomplished by using a structure that results in bitcoins being "financial assets" under UCC Article 8. "Financial assets" are assets held by an intermediary that maintains accounts for others ("accountholders") in the ordinary course of business, provided the intermediary agrees to treat the assets as financial assets under Article 8. Thus, the bitcoin metamorphosis from general intangibles to investment property is accomplished by the simple step of an intermediary agreeing to hold the bitcoins as financial assets subject to Article 8.

The Article 8 structure has the following benefits:

Bitcoins are no longer subject to liens granted in general intangibles;

Bitcoins can be transferred free from existing security interests, provided the accountholder gave value for the bitcoins in the account without notice of existence security interests;

Existing (but unknown) security interests are eliminated;

Bitcoins held in such accounts are not property of the intermediary and would not be subject to claims of the intermediary's creditors;

A security interests in the accountholder's account could be perfected by a control agreement (rather than a public filing), which maintains privacy;

Perfection by control also gives the secured creditor superior control, which should make credit both more available and less expensive. In some embodiments, "control" can accomplished by a three-party agreement among (a) securities intermediary, (b) the account holder and (c) the account holder's secured party (e.g., bank lender) where the securities intermediary agrees to follows disposition instructions from the secured party without further confirmation etc., from the account holder. Furthermore, transfer of the private key to the secured creditor is not required to perfect this "control."

The structure described herein creates legal certainty, makes bitcoins and/or other cryptocurrencies held this way more attractive as collateral and will facilitate leveraging bitcoin investments with debt financing.

Since transfers of bitcoins are made by an intermediary on instructions of an account holder, there is an additional layer of privacy for the accountholder. Various privacy protocols can be utilized by the parties. More specifically, in some embodiments, the account agreement between the account holder and the securities intermediary can provide for any number of privacy protocols that the parties desire regarding communications between them. More details on system implementation of the agreement to handle control and privacy are provided herein.

The intermediary has the obligation to maintain bitcoins in a quantity corresponding to the total of all bitcoins credited to such accounts.

Furthermore, because of the legal clarity and certainty provided by this approach, an exchange adopting the techniques described herein have a clear marketing advantage over those that do not adopt it.

In some embodiments, under the current cryptocurrency ecosystem, parties lack information regarding existing security interests and liens. This circumstance leaves acquirers of bitcoins with the risk that their bitcoins may be subject to security interests and liens that diminish or eliminate the economic value of the bitcoins to owners. For bitcoins to become useful in significant commercial transactions, the present uncertainties regarding existing security interests must be removed. These uncertainties not only affect the ability of the acquirer to be certain it is receiving the value it bargained for, but also greatly diminishes the ability of the acquirer to finance such investments.

FIG. 1 is a diagram illustrating an example environment 100 in which an indirect cryptocurrency holding system 140 facilitates an encumbrance-free management of a cryptocurrency, according to an embodiment. In the example of FIG. 1, the example environment 100 includes an indirect cryptocurrency holding system 140, a distributed cryptocurrency network 150, one or more merchant point of sale (POS) devices 130, one or more website (or electronic) wallets 135, one or more exchange systems 160, various user devices 110, and a network 170. The indirect cryptocurrency holding system 140 includes a cryptocurrency management system 120 having any number of processing systems 122 and databases 123 for managing cryptocurrency accounts. The indirect cryptocurrency holding system 140 can also include a cold storage provider having data storage 146.

The user devices 110 can be any system and/or device, and/or any combination of devices/systems that can establish a connection with another device, a server and/or other systems within the network-based environment 100. The user devices 110 typically include display or other output functionalities to present data exchanged between the devices to a user. For example, the user devices 110 can be, but are not limited to, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. The user devices 110 can also be any wearable device such as watches, necklaces, rings or even devices embedded on or within the customer.

As discussed herein, in some embodiments, users can direct management and transfer of cryptocurrency via user devices 110 using an electronic or digital wallet. For example, Bitcoin users manage their bitcoin addresses by using a digital wallet. The wallets allow the users to send bitcoins, request payment, calculate the total balance of addresses in use, and generate new addresses as needed. Many wallets include precautions to keep the private keys secret, for example by encrypting the wallet data with a password or by requiring two-factor authenticated logins. In some embodiments, bitcoin wallets provide the following functionality: storage of bitcoin addresses and corresponding public/private keys on user's computer in a wallet.dat file, conduction transactions of obtaining and transferring bitcoins (BTC), also without connection to Internet providing information about the balance in BTC at all available addresses, prior transactions, spare keys. Bitcoin wallets can be implemented as stand-alone software applications, web applications, and even printed documents or memorized passphrases.

In some embodiments, the wallet is a software wallets that directly connects to the peer-to-peer bitcoin network and includes bitcoined and Bitcoin-Qt, the bitcoined GUI counterpart available for Linux, Windows, and Mac OS X. Other less resource intensive bitcoin wallets have been developed, including mobile apps for iOS and Android devices that display and scan QR codes to simplify transactions between buyers and sellers.

In some embodiments, the wallet is a website wallet such as the one or more website wallet(s) 135. The bitcoin websites 135 provide addresses associated with an online account to hold bitcoin funds on the user's behalf, similar in ways to bank accounts. Other sites function primarily as real-time markets, facilitating the sale and purchase of bitcoins with other currencies such as US dollars or euros. Users of this kind of wallet are not obliged to download all blocks of the Bitcoin block chain, and can manage one wallet with any device, regardless of location. Some wallets offer additional services. Wallet privacy is provided by the website operator. This "online" option is often preferred for the first acquaintance with bitcoin system and short-term storage of small BTC amounts.

In some embodiments, paper or tangible wallets can also be used. For example, a Bitcoin paper wallet with private key hidden beneath tamper-evident seals. Valid bitcoin address keys may be printed on paper and used to store bitcoins offline. Compared with "hot wallets"—those that are connected to the Internet—these non-digital offline paper wallets are considered a "cold storage" mechanism better suited for safekeeping bitcoins. It is safe to use only if you have printed the paper yourself. Every such "cold storage" paper obtained from a second party as a present, gift, or payment should be immediately transferred to the safer wallet because the private key could have been copied and preserved by a grantor.

Various vendors offer banknotes, coins, cards, and other physical objects denominated in bitcoins. Bitcoin balance is bound to the private key printed on the banknote or embedded within the coin. Some of these instruments employ a tamper-evident seal that hides the private key. It is generally an insecure "cold storage" because one can't be sure that the producer of a banknote or a coin had destroyed the private key after the end of a printing process and doesn't preserve it. Tamper-evident seal in this case doesn't provide the needed level of security because the private key could be copied before the seal was applied on a coin. Some vendors will allow the user to verify the balance of a physical coin on their website, but that requires trusting that the vendor did not store the private key, which would allow them to transfer the balance at a future date.

The bitcoin specification starts with the concept of a distributed timestamp server. A timestamp server works by taking a SHA256 hash function of some data and widely publishing the hash, for instance, in a newspaper or Usenet post. The timestamp proves that the data must have existed at the time, in order to produce the hash. For bitcoin, each timestamp includes the previous timestamp hash as input for its own hash. This dependency of one hash on another is what forms a chain, with each additional timestamp providing evidence that each of the previous timestamp hashes existed.

In some embodiments, the distributed cryptocurrency network 150 can be a bitcoin network comprising a peer-to-peer payment network that operates on a cryptographic protocol. Users send bitcoins, the units of currency, by broadcasting digitally signed messages to the network via user devices 110 using bitcoin wallet software. The bitcoin wallet software may be installed locally on the user devices 110. Alternatively or additionally, wallet software may be included in one or more website wallets 135.

Transactions are recorded into a distributed public database known as the block chain (e.g., public ledger 156), with consensus achieved by a proof-of-work system called "mining". The block chain is distributed internationally using peer-to-peer filesharing technology. Current protocols operate via open source software.

In some embodiments, the network timestamps transactions by including them in blocks that form an ongoing chain called the block chain. Such blocks cannot be changed without redoing the work that was required to create each block since the modified block. The longest chain serves not only as proof of the sequence of events but also records that this sequence of events was verified by a majority of the bitcoin network's computing power. As long as a majority of computing power is controlled by nodes 155 that are not cooperating to attack the network, they will generate the longest chain of records and outpace attackers.

The network itself requires minimal structure to share transactions. Messages can be broadcast on a best effort basis, and nodes can leave and rejoin the network at will. Upon reconnection, a node will download and verify new blocks from other nodes to complete its local copy of the block chain.

In some embodiments, the one or more exchange system(s) 160 either include functionality described herein with respect to the cryptocurrency management system 120 internally or interface with an external cryptocurrency management system to provide the functionality.

The network 170 may be a telephonic network, an open network, such as the Internet, or a private network, such as an intranet and/or the extranet. For example, the Internet can provide file transfer, remote log in, email, news, RSS, and other services through any known or convenient protocol, such as, but not limited to, the TCP/IP protocol, Open System Interconnections (OSI), FTP, UPnP, iSCSI, NSF, ISDN, PDH, RS-232, SDH, SONET, etc. The network 17 can be any collection of distinct networks operating wholly or partially in conjunction to provide connectivity to the merchant point of sale (POS) device 130, user devices 110, cryptocurrency management system 120 and exchange system 160 and may appear as one or more networks to the serviced systems and devices. In one embodiment, communications can be achieved by an open network such as the Internet, or a private network, such as an intranet and/or extranet. In one embodiment, communications can be achieved by a secure communications protocol, such as secure sockets layer (SSL) or transport layer security (TLS).

In addition, communications can be achieved via one or more wireless networks, such as, but not limited to, one or more of a Local Area Network (LAN), Wireless Local Area Network (WLAN), a Personal Area Network (PAN), a Campus Area Network (CAN), a Metropolitan Area Network (MAN), a Wide Area Network (WAN), a Wireless Wide Area Network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G networks, Enhanced Data rates for GSM Evolution (EDGE), General Packet Radio Service (GPRS), enhanced GPRS, messaging protocols such as TCP/IP, SMS, MMS, Extensible Messaging and Presence Protocol (XMPP), Real Time Messaging Protocol (RTMP), Instant Messaging and Presence Protocol (IMPP), instant messaging, USSD, IRC, or any other wireless data networks or messaging protocols.

As discussed, the one or more databases 123 may be included in or otherwise in communication with the cryptocurrency management system 120 and configured to store various content, software, descriptive data, images, system information, drivers, and/or any other data item or file utilized by the cryptocurrency management system 120. The one or more databases 123 may be managed by a database management system (DBMS), for example but not limited to, Oracle, DB2, Microsoft Access, Microsoft SQL Server, PostgreSQL, MySQL, FileMaker, etc. The one or more databases 132 can be implemented via object-oriented technology and/or via text files, and can be managed by a distributed database management system, an object-oriented database management system (OODBMS) (e.g., Concept-Base, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

Figures 2A, 2B:
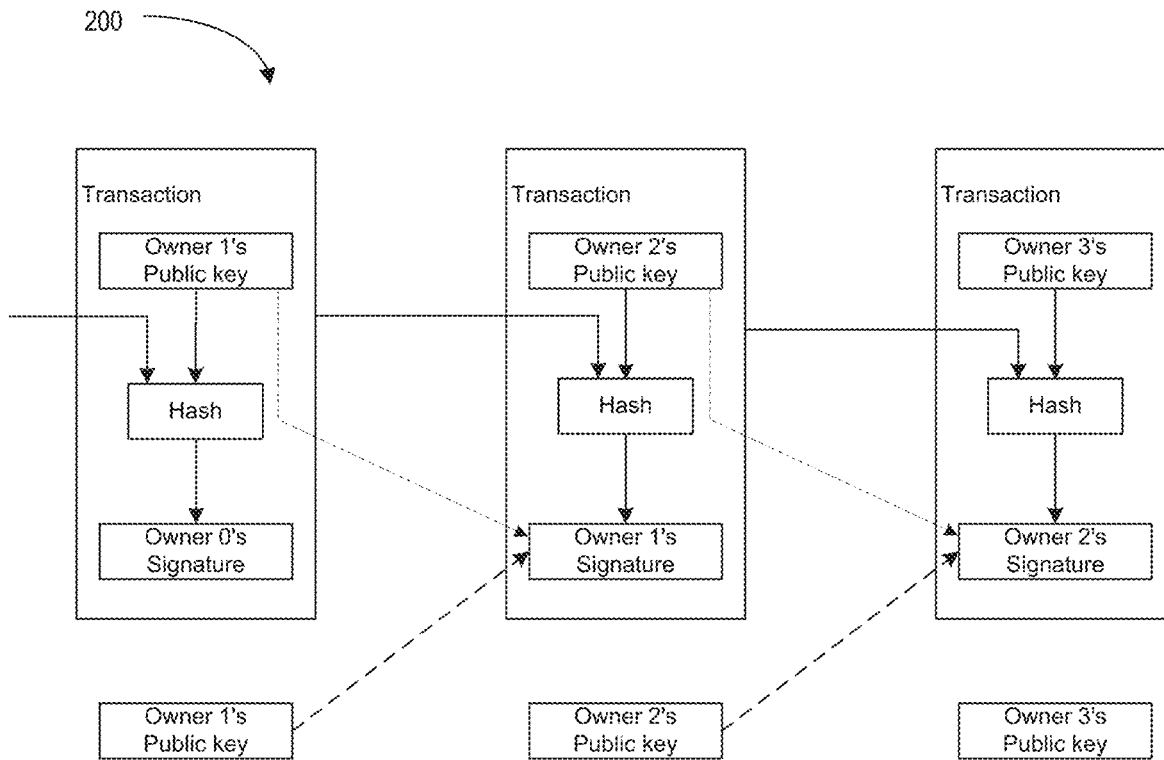
FIG. 2a depicts a diagram illustrating an example cryptocurrency transfer, according to an embodiment.
FIG. 2b illustrates a bitcoin transaction log showing addresses, according to an embodiment.

FIG. 2a depicts a diagram illustrating an example cryptocurrency transfer 200, according to an embodiment. More specifically, the example cryptocurrency transfer 200 is an example bitcoin transfer.

As described herein, a transaction is a section of data confirmed by a signature. The transaction is sent to a bitcoin network (e.g., distributed cryptocurrency network 150) and forms blocks. The transaction typically contains references to preceding transactions and associates a certain number of bitcoins with one or several public keys (bitcoin addresses). The transaction is typically not encrypted because there is nothing to encrypt in the bitcoin system. A block chain browser is where all transactions are combined in the form of a block chain. They can be found and verified. This is necessary to determine technical transaction parameters as well as verify the details of payments.

A bitcoin is defined by a sequence of digitally signed transactions that began with its creation as a block reward. The owner of a bitcoin transfers it to the next owner by digitally signing it over to the next owner in a bitcoin transaction, much like endorsing a traditional bank check. A payee can verify each previous transaction to verify the chain of ownership. Bitcoin transactions are irreversible, which eliminates risk of chargeback fraud.

A bitcoin is a currency object—an entity which is traded, though nothing prevents trades in fractions of, or multiple bitcoins. Bitcoins are intended to be fungible, though each has its own distinct history.

Although it would be possible to handle bitcoins individually, it would be unwieldy to make a separate transaction for every satoshi in a transfer. Transactions are therefore allowed to contain multiple inputs and outputs, and in that way bitcoins can be split and combined. Common transactions will have either a single input from a larger previous transaction or multiple inputs combining smaller amounts, and one or two outputs: one for the payment, and one returning the change, if any, back to the sender. Any difference between the total input and output amounts of a transaction is offered to miners as a transaction fee.

Transaction confirmation is needed to prevent double spending of the same money. Usually when new bitcoins are earned, the owner isn't free to utilize them immediately. As soon as a transaction is started it is sent to the bitcoin network for processing and it has to be included in a block before becoming legitimate. The process of implementing a transaction in a newly found block is called a transaction confirmation. Inclusion in one block=one confirmation and when there are six or more of such confirmations the transaction is considered confirmed. This feature was introduced to protect the system from repeated spending of the same bitcoins (double-spending). Inclusion of transaction in the block happens along with the process of mining.

The classic bitcoin client will show the transaction as "unconfirmed" until there are six confirmations (six found blocks). Sites or services that accept bitcoin as payment for their products or services can set their own limits on how many blocks are needed to be found to confirm a transaction. The number six was chosen deliberately: it is based on a theory that there's low probability of wrongdoers being able to amass more than 10% of entire network's hash rate for purposes of transaction falsification and an insignificant risk (lower than 0.1%) is acceptable. For offenders who don't possess significant computing power, 6 confirmations are an insurmountable obstacle. In their turn people who possess more than 10% of power aren't going to find it hard to get 6 confirmations in a row. However to obtain such a power would require millions of dollars' worth of investments which lowers the risk of an attack. Bitcoins that are distributed by the network for finding a block can only be used after 100 confirmations e.g. 100 discovered blocks. The classic bitcoin client won't display the coins earned for solving a block until there are 120 confirmations.

Two consecutive SHA-256 hashes are used for transaction verification. RIPEMD-160 is used after a SHA-256 hash for bitcoin digital signatures or "addresses." A bitcoin address is the hash of an ECDSA public-key, computed as follows:

Key hash=Version concatenated with RIPEMD-160 (SHA-256(public key))

Checksum=1st 4 bytes of SHA-256(SHA-256(Key hash))

Bitcoin address=Base58Encode(Key hash concatenated with Checksum)

FIG. 2b illustrates a bitcoin transaction log showing bitcoin addresses, according to an embodiment.

In some embodiments, the bitcoin address is an identifier (account number), starting with 1 or 3 and containing 27-34 alphanumeric Latin characters (except 0, O, I, l). Address can be also represented as the QR-code, is anonymous and does not contain information about the owner. It can be obtained for free, using, for example, bitcoin software.

The ability to transact bitcoins without the assistance of a central registry is facilitated in part by the availability of a virtually unlimited supply of unique addresses which can be generated and disposed of at will. The balance of funds at a particular bitcoin address can be ascertained by looking up the transactions to and from that address in the block chain. All valid transfers of bitcoins from an address are digitally signed using the private keys associated with it.

A private key in the context of bitcoin is a secret number that allows bitcoins to be spent. Every bitcoin address has a matching private key, which is usually saved in the wallet file of the person who owns the balance but can be also stored using other means and methods. The private key is mathematically related to the bitcoin address, and is designed so that the bitcoin address can be calculated from the private key but, importantly, the reverse cannot be done.

Figure 3:
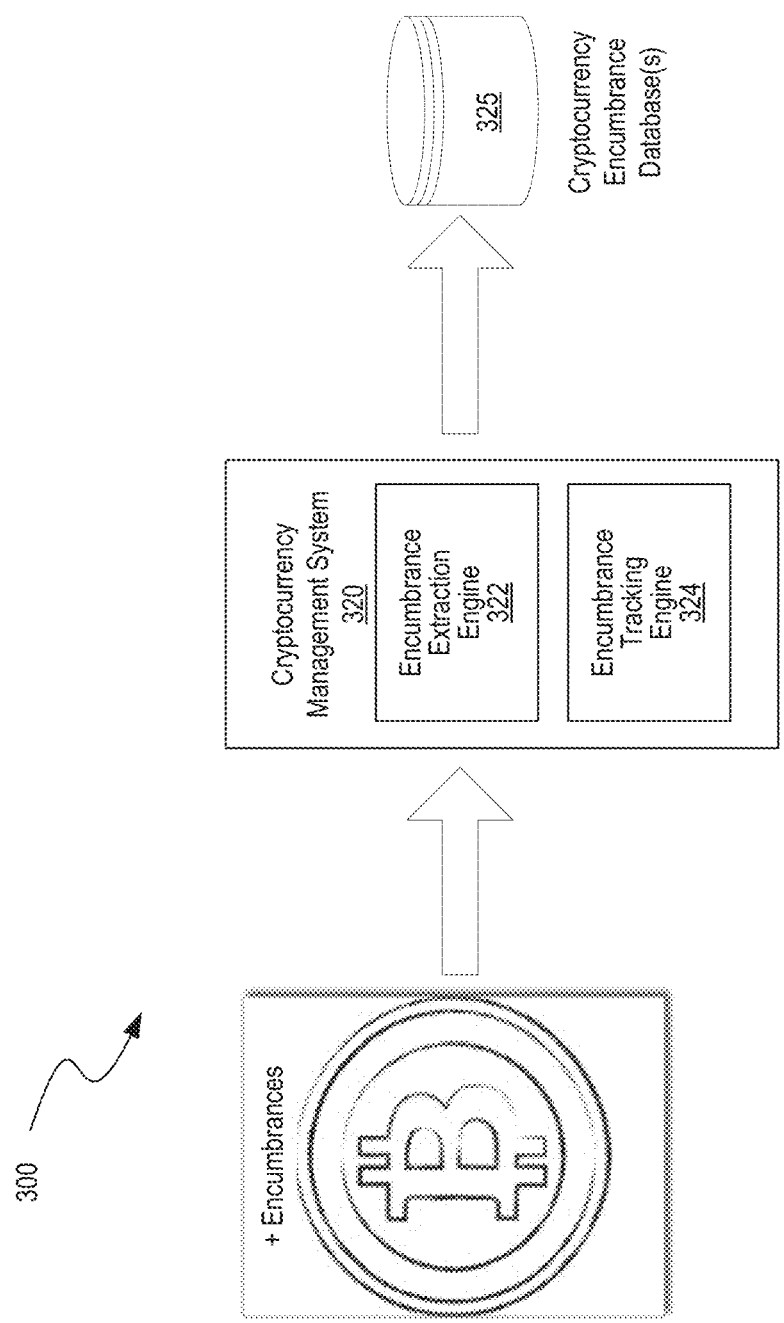
FIG. 3 is a flow diagram illustrating an example transaction in which a cryptocurrency holding system facilitates management of encumbrances on cryptocurrency, according to an embodiment.

FIG. 3 is a flow diagram illustrating an example transaction 300 in which a cryptocurrency holding system 320 facilitates management of encumbrances on cryptocurrency, according to an embodiment. In some embodiments, the cryptocurrency holding system 320 includes an encumbrance extraction engine 322 and an encumbrance tracking engine 324. The cryptocurrency holding system 320 may include additional or fewer modules, engine, and/or components.

According to the example of FIG. 3, the cryptocurrency holding system 320 identifies and manages encumbrances on various cryptocurrencies in a cryptocurrency encumbrance database 325. For example, encumbrance extraction engine 322 can attempt to identify encumbrances on particular cryptocurrency and the encumbrance tracking engine 324 can maintain a list of known adverse claims. Thus, the cryptocurrency holding system 320, in conjunction with cryptocurrency encumbrance database 325, maintains a list of the liens known by the account holder at the time the account holder acquires rights in the account.

As described herein, in some embodiments, the system 320 includes an asset conversion module that converts cryptocurrency held by a user from an intangible asset type to a financial asset type, and an asset holding module that stores information identifying the cryptocurrency held by the user along with electronic credentials associated with accessing the cryptocurrency in a holding account for the user.

The system 320, therefore, may generate a digital contract for a recipient of a cryptocurrency transfer that converts transferred cryptocurrency from an intangible asset type to a financial asset type, and store the generated digital contract along with electronic credentials associated with accessing the digital currency in a holding account for the recipient.

Figure 4:
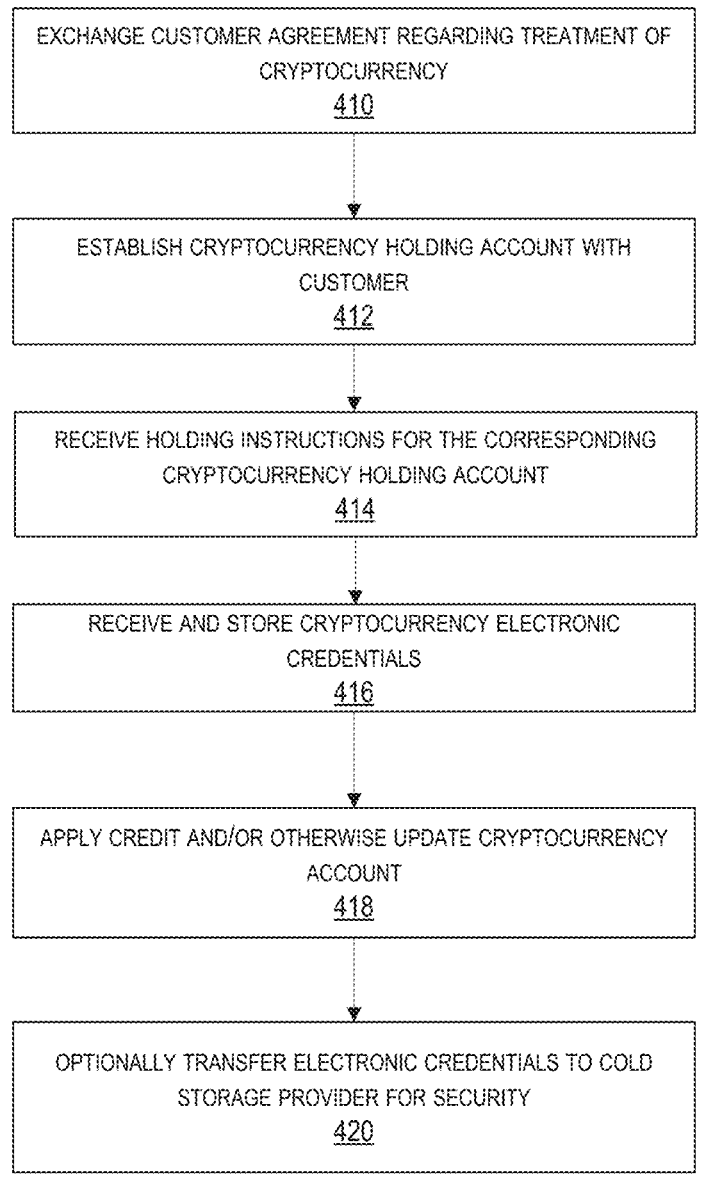
FIG. 4 is a data flow diagram depicting example operation of an indirect cryptocurrency holding system to facilitate encumbrance-free management of a cryptocurrency, according to an embodiment.

FIG. 4 is a data flow diagram depicting an example operation 400 of an indirect cryptocurrency holding system, such as the indirect cryptocurrency holding system example 140 of FIG. 1 or system 320 to facilitate encumbrance-free management of a cryptocurrency, according to an embodiment.

To begin, at process 410, the cryptocurrency holding system provides a customer with an agreement with respect to treatment of one or more cryptocurrencies. In some embodiments, the agreement is a web form, XML document or other electronic document or data structure that embodies an account agreement. The account agreement includes information noted herein (parties, electronic addresses, etc.), where such information is inserted in fields, is tagged, or is otherwise provided/manipulated for automated access and searching. Further, the agreement includes a statement to the effect that "the [securities intermediary] agrees that the cryptocurrency held in the account will be treated as a "financial asset" under UCC Article 8." These or similar words in the agreement with the securities intermediary result in the cryptocurrency being converted from a "general intangible" asset under UCC Article 9 to "investment property" under UCC Article 9. Furthermore, the conversion results in the benefits described herein such as, for example, the benefits provided by UCC Article 8 (such as causing any unknown liens to be unenforceable).

In some embodiments, the agreement can also include provisions established between the customer, e.g., a debtor, and secured party. Alternatively or additionally, these or other provisions can be subsequently established based on the account in with the cryptocurrency is held and treated as a "financial asset." Again, the web form, XML document, etc. includes provisions to accommodate the inclusion of data for such parties and information associated therewith.

At process 412, the cryptocurrency holding system establishes cryptocurrency holding account with the customer based on the agreement. At process 414, the cryptocurrency holding system receives holding instructions for the corresponding cryptocurrency holding account. For example, in some embodiments, the customer (or account holder) can direct the securities intermediary to purchase a cryptocurrency for the holding account.

At process 416, the cryptocurrency holding system receives and stores cryptocurrency electronic credentials. At process 418, the cryptocurrency holding system applies credit and/or otherwise updates the cryptocurrency account.

At process 420, the cryptocurrency holding system optionally transfers electronic credentials to cold storage provider for security. For example, if the securities intermediary prefers not to take on the risk that the private key will be hacked from its computer system, the securities intermediary can elect to enter into a sub custodian agreement with someone in the business of providing cold storage. Cold storage can include various methods of secure offline storage of data.

Figure 5:
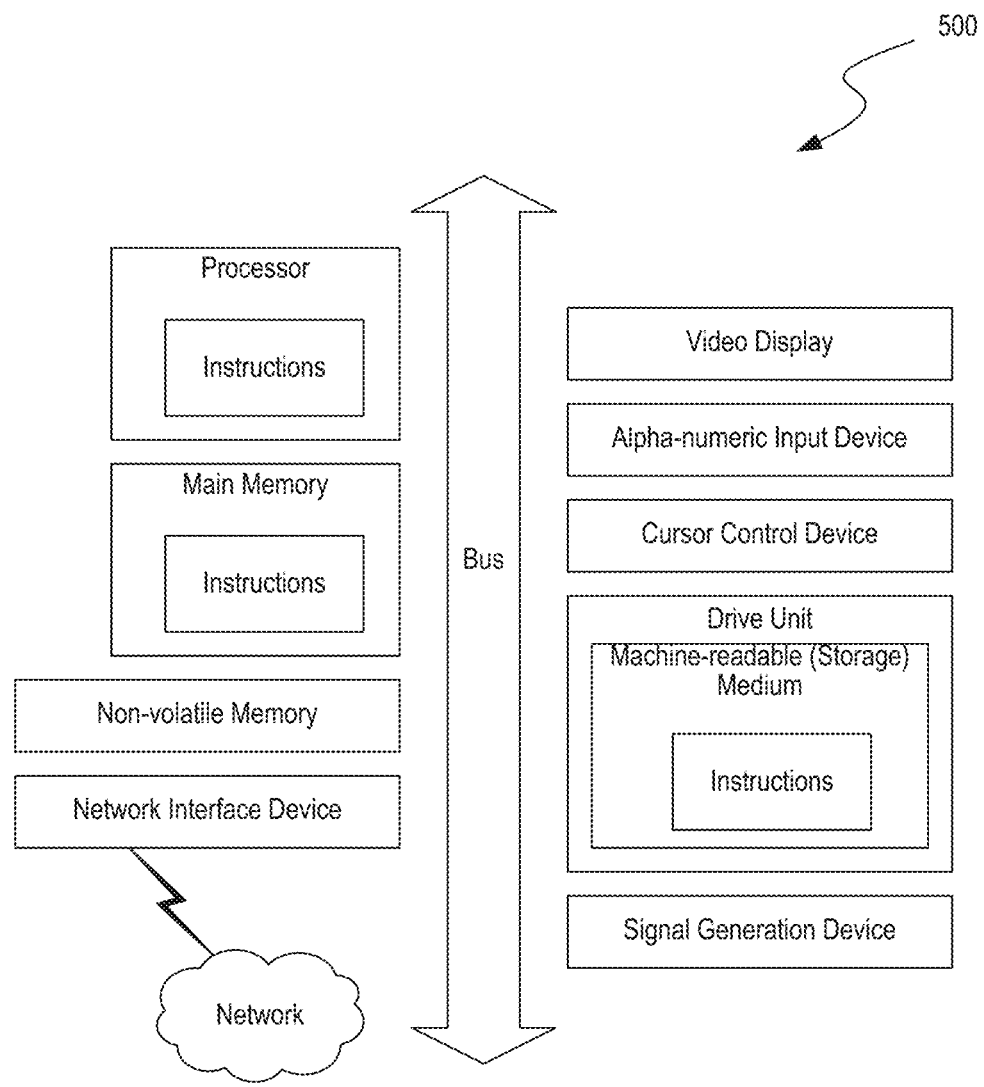
FIG. 5 is a diagrammatic representation of a machine in the example form of a computer system within which a set of instructions, for causing the machine to perform any one or more of the methodologies discussed herein, may be executed.

FIG. 5 depicts a diagrammatic representation of a machine, in the example form, of a computer system 500 within which a set of instructions, for causing the machine to perform any one or more of the methodologies discussed herein, may be executed. The computer system 500 can be representative of any computer system, server, etc., described herein.

In the example of FIG. 5, the computer system 500 includes a processor, memory, non-volatile memory, and an interface device. Various common components (e.g., cache memory) are omitted for illustrative simplicity. The computer system 500 is intended to illustrate a hardware device on which any of the components depicted in the example of FIG. 1 (and any other components described in this specification) can be implemented. The computer system 500 can be of any applicable known or convenient type. The components of the computer system 500 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 500. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 5 reside in the interface.

In operation, the computer system 500 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout tFxahe description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. A method for performing unencumbered transfers of digital currency, the method comprising:
   performing a transfer of digital currency from an owner of the digital currency to a recipient of the digital currency,
      wherein the owner, through a computing system, accesses, in a digital wallet, a private key associated with the digital currency and, using the digital wallet, causes the transfer of the digital currency,
      wherein the transfer of digital currency includes transferring a sequence of digitally signed transactions from the owner to the recipient and broadcasting the sequence of digitally signed transactions to a network, and
      wherein the recipient, through another computing system, receives the transferred digital currency at an address and stores another private key corresponding to the address in another digital wallet;
   recording the performed transfer of digital currency to a block chain public ledger;
   generating a digital contract for the recipient that converts the transferred digital currency from an intangible asset type to a financial asset type,
      wherein the generated digital contract provides for an intermediary to hold the transferred digital currency as a financial asset, and
      wherein the conversion of the transferred digital currency from an intangible asset type to a financial asset type removes any existing, but unknown to the recipient, security interests associated with the transferred digital currency; and
   storing the generated digital contract along with electronic credentials associated with accessing the digital currency in a holding account for the recipient,
      wherein the electronic credentials associated with accessing the digital currency comprise the other private key or a different private key.

2. The method of claim 1, further comprising:
   performing a transaction associated with the block chain public ledger to record information representing the digital contract to the block chain public ledger.

3. The method of claim 1, wherein the digital contract converts the transferred digital currency from a general intangible asset type under Uniform Commercial Code (UCC) Article 9 to an investment property asset type under UCC Article 9, and wherein the digital contract is stored in tamper-resistant, non-volatile memory.

4. The method of claim 1, wherein an intermediate holding system generates the digital contract for the recipient and maintains the holding account for the recipient.

5. The method of claim 1, wherein generating a digital contract for the recipient that converts the transferred digital currency from an intangible asset type to a financial type asset includes generating provisions within the digital contract that are established between the recipient and secured parties that have encumbered the transferred digital currency.

6. The method of claim 1, further comprising:
   providing, to the intermediary, access information for the transferred digital currency,
      wherein the intermediary stores the access information in at least one of a different digital wallet, a tangible wallet, a paper wallet, or an offline cold storage component.

7. The method of claim 1, wherein either the generated digital contract or a different contract is a control agreement between at least the recipient, the intermediary, and a secured creditor, wherein the recipient is a debtor, wherein the secured creditor receives a security interest in the transferred digital currency, wherein the intermediary agrees to follow disposition instructions from the secured creditor, and wherein the control agreement perfects the received security interest, the method further comprising:
   providing, to the intermediary, access information for the transferred digital currency,
      wherein the intermediary stores the access information in at least one of a different digital wallet, a tangible wallet, a paper wallet, or offline cold storage, and
      wherein the secured creditor does not receive the access information.

8. A non-transitory, computer-readable storage medium whose contents, when executed by a computing system, cause the computing system to perform a method for performing unencumbered transfers of cryptocurrency, the method comprising:

performing a transfer of cryptocurrency from an owner of the cryptocurrency to a recipient of the cryptocurrency, wherein the owner, through a computing system, accesses, in a digital wallet, a private key associated with the cryptocurrency and, using the digital wallet, causes the transfer of the cryptocurrency, wherein the transfer of the cryptocurrency includes transferring a sequence of digitally signed transactions from the owner to the recipient and broadcasting the sequence of digitally signed transactions to a network, and wherein the recipient, through another computing system, receives the transferred cryptocurrency at an address and stores another private key corresponding to the address in another digital wallet;

recording the performed transfer of the cryptocurrency to a block chain public ledger;

generating a digital contract for the recipient that converts the transferred cryptocurrency from an intangible asset type to a financial asset type, wherein the generated digital contract provides for an intermediary to hold the transferred cryptocurrency as a financial asset, and wherein the conversion of the transferred digital currency from an intangible asset type to a financial asset type removes any existing, but unknown to the recipient, security interests associated with the transferred cryptocurrency; and storing the generated digital contract along with electronic credentials associated with accessing the cryptocurrency in a holding account for the recipient, wherein the electronic credentials associated with accessing the cryptocurrency comprise the other private key or a different private key.

9. The computer-readable storage medium of claim 8, further comprising:

performing a transaction associated with a block chain registry to record information representing the digital contract to the block chain registry.

10. The computer-readable storage medium of claim 8, wherein the digital contract converts the transferred cryptocurrency from a general intangible asset type under Uniform Commercial Code (UCC) Article 9 to an investment property asset type under UCC Article 9, and wherein the digital contract is stored in a smart card or within non-volatile memory of a mobile phone.

11. The computer-readable storage medium of claim 8, wherein an intermediate holding system generates the digital contract for the recipient and maintains the holding account for the recipient.

12. The computer-readable storage medium of claim 8, wherein generating a digital contract for the recipient converts the transferred cryptocurrency from an intangible asset type to a financial asset type includes generating provisions within the digital contract that are established between the recipient and secured parties that have encumbered the transferred cryptocurrency.

13. A computing system comprising:

one or more processors; and one or more memories storing instructions that, when executed by the one or more processors, cause the computing system to perform a method comprising:

performing a transfer of digital currency from an owner of the digital currency to a recipient of the digital currency, wherein the owner, through a computing system, accesses, in a digital wallet, a private key associated with the digital currency and, using the digital wallet, causes the transfer of the digital currency, wherein the transfer of digital currency includes transferring a sequence of digitally signed transactions from the owner to the recipient and broadcasting the sequence of digitally signed transactions to a network, and wherein the recipient, through another computing system, receives the transferred digital currency at an address and stores another private key corresponding to the address in another digital wallet;

recording the performed transfer of digital currency to a block chain public ledger;

generating a digital contract for the recipient that converts the transferred digital currency from an intangible asset type to a financial asset type, wherein the generated digital contract provides for an intermediary to hold the transferred digital currency as a financial asset, and wherein the conversion of the transferred digital currency from an intangible asset type to a financial asset type removes any existing, but unknown to the recipient, security interests associated with the transferred digital currency; and storing the generated digital contract along with electronic credentials associated with accessing the digital currency in a holding account for the recipient, wherein the electronic credentials associated with accessing the digital currency comprise the other private key or a different private key.

14. The computing system of claim 13, further comprising:

performing a transaction associated with a block chain registry to record information representing the digital contract to the block chain registry.

15. The computing system of claim 13, wherein the digital contract converts the transferred digital currency from a general intangible asset type under Uniform Commercial Code (UCC) Article 9 to an investment property asset type under UCC Article 9, and wherein the digital contract is stored in a smart card or within non-volatile memory of a mobile phone.

16. The computing system of claim 13, wherein an intermediate holding system generates the digital contract for the recipient and maintains the holding account for the recipient.

17. The computing system of claim 13, wherein generating a digital contract for the recipient that converts the transferred digital currency from an intangible asset type to a financial asset type includes generating provisions within the digital contract that are established between the recipient and secured parties that have encumbered the transferred cryptocurrency.

* * * * *